S. H. KLINE.
WIRELESS CHECK ROW PLANTER.
APPLICATION FILED AUG. 15, 1910.
975,365.
Patented Nov. 8, 1910.
3 SHEETS—SHEET 3.
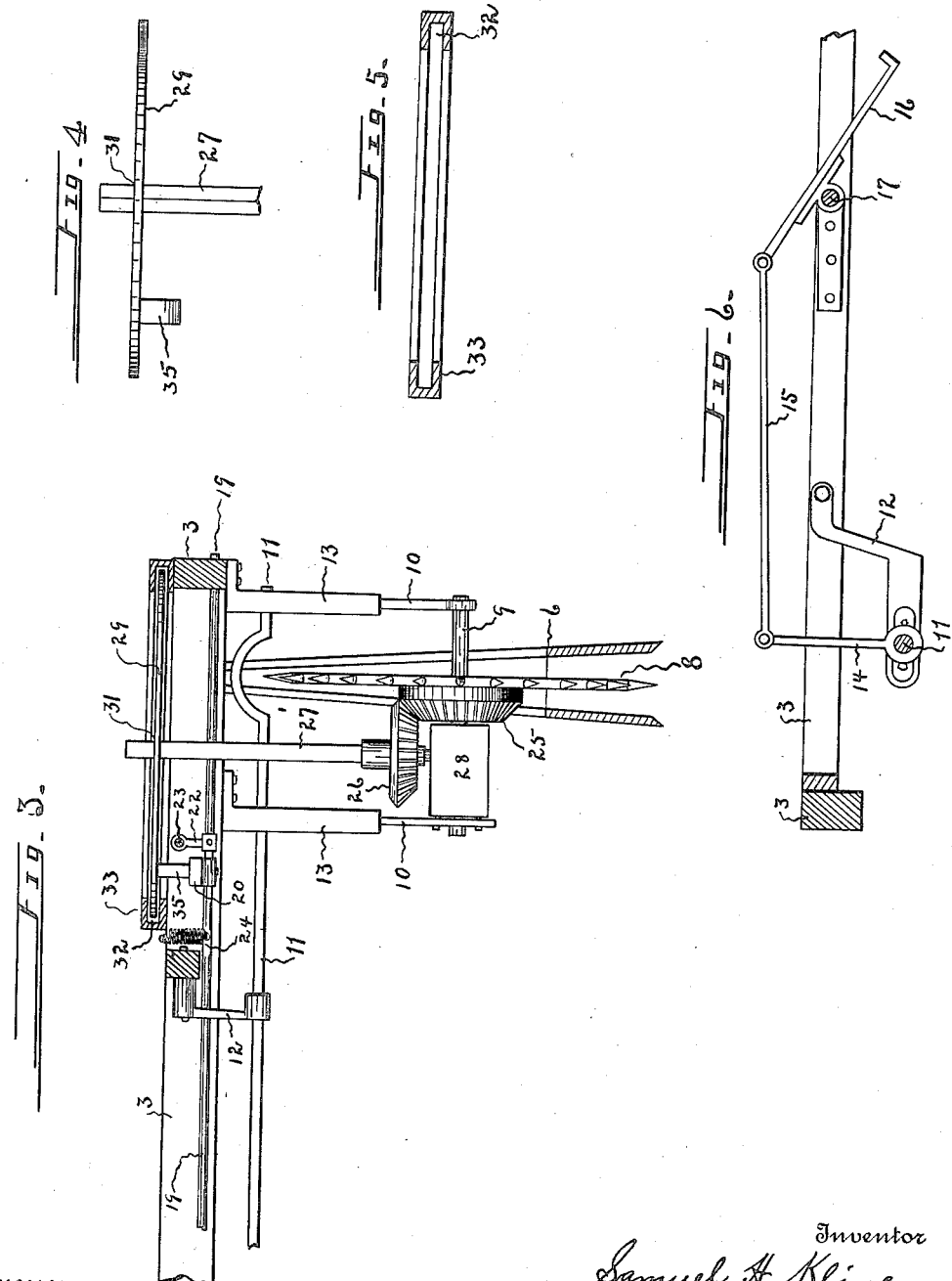

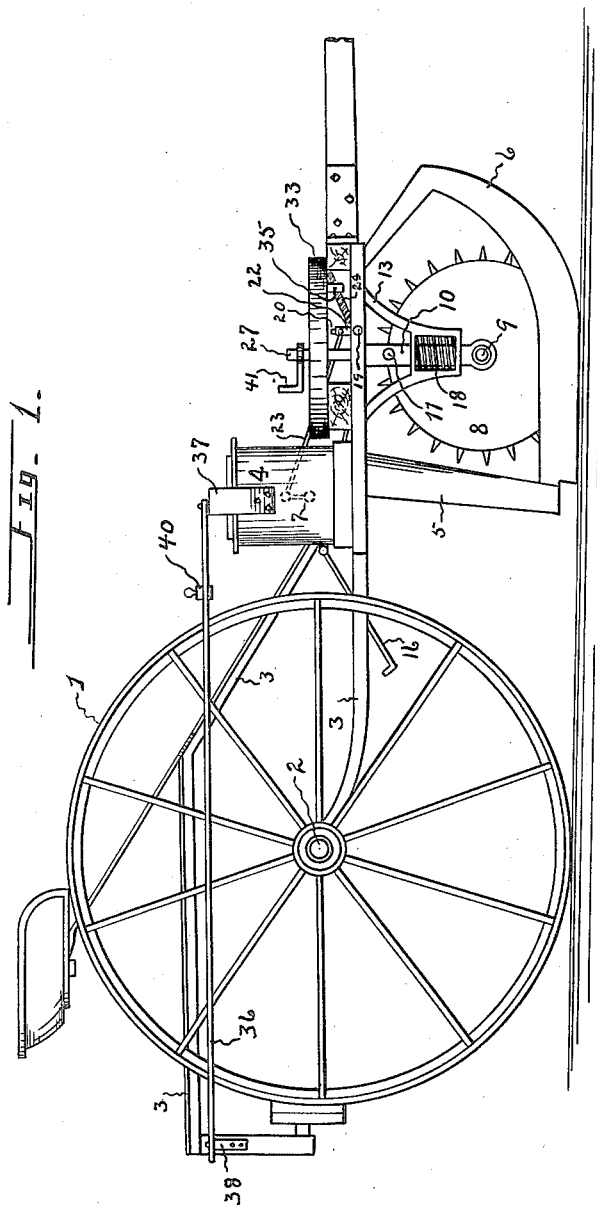

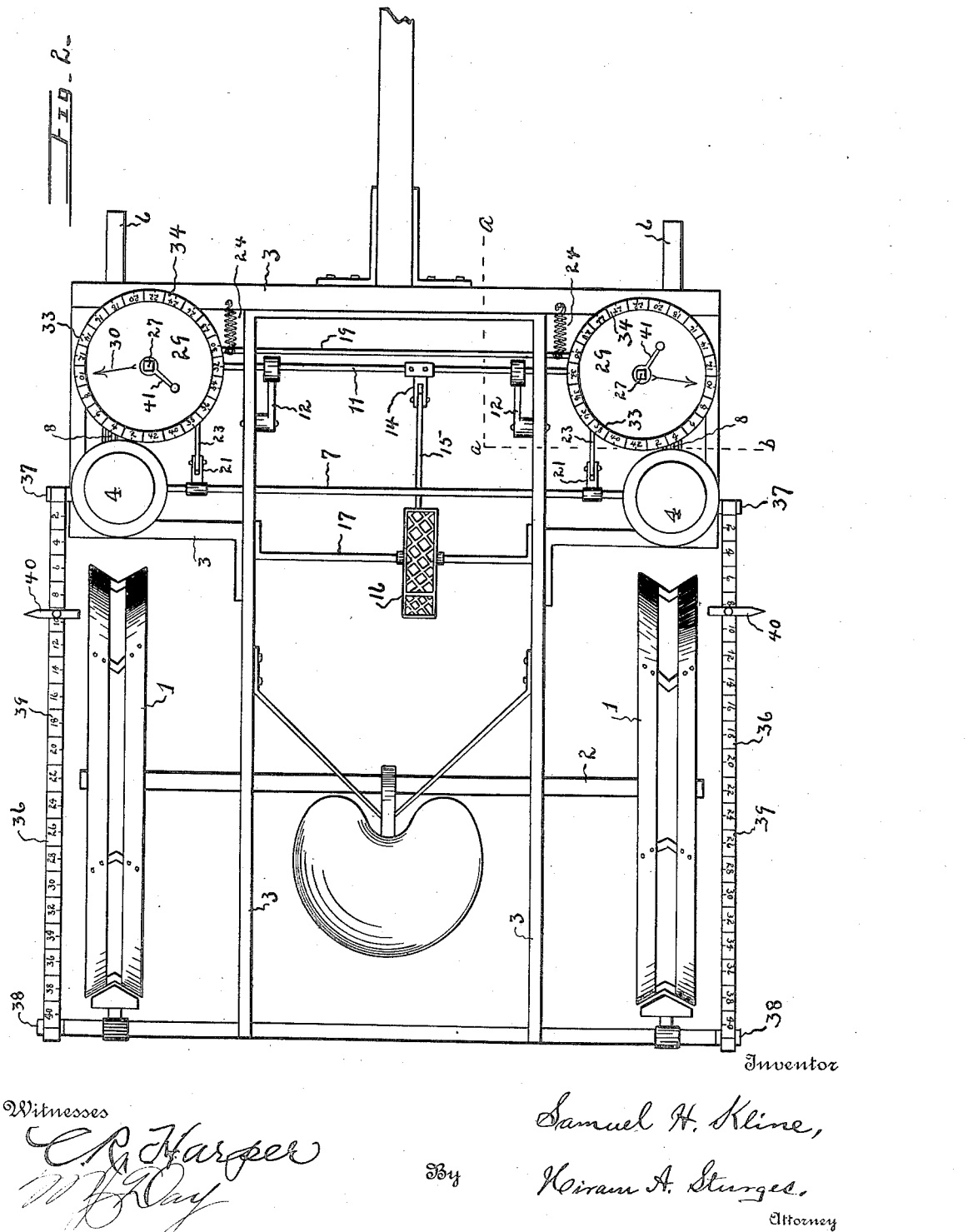

UNITED STATES PATENT OFFICE.

SAMUEL H. KLINE, OF EARLING, IOWA.

WIRELESS CHECK-ROW PLANTER.

975,365.　　　　　Specification of Letters Patent.　　Patented Nov. 8, 1910.

Application filed August 15, 1910. Serial No. 577,292.

*To all whom it may concern:*

Be it known that I, SAMUEL H. KLINE, a citizen of the United States, residing at Earling, in the county of Shelby and State of Iowa, have invented certain new and useful Improvements in Wireless Check-Row Planters, of which the following is a specification.

This invention relates to improvements in wireless check row planters, and has for its principal object to provide an implement for planting corn or other like cereals, by use of which the check-row wire, ordinarily employed, may be dispensed with, and the hills will be located at uniform distances apart, regardless of uneven surfaces.

Another object is to provide means for the foregoing purpose, which will consist of few and simple parts, to the end that they may be manufactured economically and will be durable in wear.

With these and other objects in view the invention consists of the novel construction, combination and arrangement of parts as described herein and claimed and as illustrated in the drawing, it being understood that changes in form, size, proportion and minor details may be made within the scope of the claims without departing from the spirit of the invention or sacrificing any of its advantages.

In the accompanying drawing, which illustrates the preferred embodiment of the invention, Figure 1 is a side elevation of a planter with my improvements applied thereto. Fig. 2 is a plan view of the same. Fig. 3 is an enlarged detail relating to Figs. 1 and 2, being a sectional view on line *a a b* of Fig. 2, looking to the front of the planter, to show certain gearing and other parts connected with the toothed disk. Fig. 4 is an edgewise view of the horizontal indicating disk. Fig. 5 is a detail relating to Fig. 3 to clearly show the disk-frame. Fig. 6 is a detail showing the tread-lever and its connecting parts.

Referring now to the drawing for a more particular description, the wheels 1 of the planter are mounted upon an axle 2 which supports the frame 3, and upon the frame are mounted the seed boxes 4, seed tubes 5 and furrow-openers 6, the rock-shaft for the seed-boxes being indicated at 7, the same being actuated to cause a dropping of the seed at intervals. Since my construction relates to means for operating shaft 7, the parts above mentioned may be of any preferred construction.

At 8 are indicated toothed disks, one being journaled in front of each seed tube 5 between the runners of each furrow-opener 6, each of said disks being mounted upon a shaft 9 having bearings in the lower ends of upright sliding-plates 10.

At 11 is indicated a transversely disposed shaft supported upon the frame by rock-arms 12, and upon the ends of shaft 11 the sliding-plates 10 are pivotally mounted, hangers 13 suitably secured to frame 3 being provided as a support for plates 10. Shaft 11, between its ends, is provided with a crank-arm 14 upon which may be pivotally mounted a tread-lever 15, and by means of treadle 16, mounted upon shaft 17, shaft 11 may be controlled, said treadle being a means for lowering or elevating the toothed disk 8 to the end that said disk may, respectively, engage or become disengaged from the soil, a spring 18 preferably being employed, adjacent to each of disks 8, with bearings upon the hangers 13 and plates 11, with a tendency to cause the toothed disks to remain, normally, in a lowered position.

In order that rock-shaft 7 may be actuated by the movements of disks 8, a rod or shaft 19 is employed having suitable bearings in frame 3 and disposed substantially parallel with said shaft 7. It may be provided near its ends with wings or lugs 20, said wings being disposed in alinement and rigidly secured to the shaft. Shafts 7 and 19 are respectively provided with crank-arms 21 and 22, and, mounted upon and extending between these arms are links 23, and therefore, an oscillating movement imparted to shaft 19 will be communicated to rock-shaft 7, subject to the resistance of springs 24, said springs being mounted upon shaft 19 and upon the front part of frame 3.

For the purpose of causing actuation of shaft 19, the inner side of each of the toothed disks 8 is provided with a gear wheel 25 rigidly mounted thereon, and each of gears 25 meshes with a gear wheel 26 mounted upon a spindle 27. The lower end of each spindle is pivotally mounted in a sleeve 28 supported by a shaft 9; and in operation, when a toothed disk 8 is actuated by its engagement with the soil while the planter moves forwardly, its shaft 9 will be rotated in its bearings in the lower ends of plates 10 and rotates within a sleeve 28, and each upright spindle 27 will thereby be rotated. Spindles 27 are preferably formed with square stems, and I provide two horizontally disposed disks 29, each having a visible indicating mark or character 30 thereon and provided at its middle with a square aperture 31, traversed by the spindle. The two disks 29, thus employed, are each mounted loosely within the annular slot 32 of a circular housing-frame or collar 33, each collar or frame being secured rigidly upon the frame of the planter, and provided with a visible numerical scale 34, near its periphery. The rotatable movement of each spindle therefore causes a rotatable movement of a disk 29. Upon the lower side of each horizontal disk 29 and near its periphery is rigidly secured a short contact-arm or lug 35. Lugs or wings 20 on transverse shaft 19 are disposed in the pathway of contact-arms 35, and during each complete rotation of the horizontal indicating disks, their lugs or arms 35 will make contact with said lugs 20, whereby shaft 19 will be actuated or partly rotated, and by this operation rock-shaft 7 will be actuated to cause the seed to be deposited at regular intervals. Disks 29 move uniformly, and at each complete rotatable movement of these disks seed will simultaneously pass from seed-boxes 4 through seed tubes 5 for a hill for each of the two rows. It is necessary, of course, for exactness of operation, that both of lugs 35 should make contact with lugs 20 at the same time, and not in alternation, and the parts are therefore adjusted in a manner so that shaft 19 will be actuated only once during each simultaneous, rotatable movement of the disks. If desired, one of lugs 20 may be removed from shaft 19, and the contact of the remaining lug 20 with a lug 35, may be depended upon for actuation of shaft 19.

On account of the construction as described, the use of wire suspended across a field for checking the rows, may be dispensed with. During operation, the toothed disks 8 are lowered so that they engage the ground in a manner to cause positive rotation, while the planter is moving forwardly, regardless of ordinary uneven surfaces. The location of the toothed disks is considered to be particularly of advantage. No other location for the toothed disks would be as effective for causing reliable operation. Since the disks are disposed in the furrows between the plates or members 6, their teeth engage more firm soil and are exposed to less obstructions and encounter less uneven surfaces than when located elsewhere. Also by reason of the engagement of the teeth at the bottom of the furrows, the soil is somewhat loosened and this results favorably in preparing the soil for the planting of the seed.

It is desirable, especially in the planting of corn, that the hills of each row shall be in alinement, said rows appearing at right angles to each other; and for this purpose it is necessary that the hills, as well as the rows, shall be at equal distances from each other.

At 36 is indicated a pair of measuring strips, each being disposed longitudinally of the vehicle and, preferably, disposed adjacent to and outwardly of a carrying wheel. They may be supported upon suitable brackets 37 and 38 mounted respectively upon the seed boxes and rear part of the planter frame, the front end of each measuring-strip being disposed above a seed tube. Strips 36 may be of any suitable length, and each bear visible indicating characters 39 to represent inches, the number of inches being 42 in the present instance, although this may be changed to a greater or lesser number if desired.

The numerals 34 upon the circular housing-frame 33 correspond to the numerals 39 of strips 36. The parts are so proportioned and adjusted that, during a forward movement of the planter, when the toothed disks move upon the ground a distance of 42 inches, each horizontal disk 29 describes a complete rotation, and its contact-lug 35 actuates shaft 19 to cause a deposit of seed through tubes 5.

In operation, when the operator reaches the end of a field, by use of treadle 16, the toothed disks are elevated so that they do not engage the ground. The operator then reverses the planter or causes it to move into position ready for planting the next two rows.

At 40 are indicated handles or hand-strips slidingly mounted upon measuring strips 36. When passing out of the cultivated ground at the end of the field, the last deposits of seed passing through tubes 5 for the completed rows remain uncovered, and may therefore be readily seen by the driver or operator after he has moved the planter into position for the next two rows. At this time the operator slides handles 40 upon strips 36 until they are in alinement with the two uncovered seed-deposits mentioned, and the locations of the handles upon the strips will indicate the number of inches, in horizontal measurement, between the ends of the seed-tubes and the first hills of the new rows to be planted. To operator then, by use, manually, of hand-cranks 41 applied to the upper ends of spindles 27, causes a part rotation of disks 29. If, for instance, the measurements indicated by strips 36 is ten inches, the hills of the rows being 42 inches apart, the operator, by use of cranks 41, partly rotates disks 29, until indexes 30 point to numerals 10 upon the upper surfaces of collars 33, and the toothed disks are then lowered. By these simple means an operator may readily adjust the parts, and the hills of each row will be in alinement. It will be understood, of course, that an operator may use only one of hand-strips 40 for ascertaining distances, but for alining purposes both may be used to advantage.

Having fully described the several parts of my invention, a further explanation relating to operation is not necessary.

What I claim and desire to secure by Letters Patent is,—

1. A planter of the class described, comprising, in combination with the seed-dropping shaft, a disk housing stationary upon the frame and bearing indicating devices; a vertically-adjustable, rotatable, toothed ground wheel supported by the frame; an upright spindle rotatable by the ground wheel; a horizontal indicating-disk mounted in said disk-housing and rotatable by the spindle; a lug-bearing rock-shaft connected with the seed-dropping shaft, and means upon the indicating-disk for actuating the rock shaft during its rotatable movement.

2. A planter of the class described, comprising, in combination with a seed-dropping shaft, a wing-bearing rock shaft connected therewith; means for actuating said rock shaft comprising a rotatable, vertically-adjustable ground wheel provided with a pinion, an upright spindle having a gear in engagement with the pinion of the ground wheel, a horizontal indication-disk rotated by the spindle, and means upon the indicating-disk for engaging the wing of the rock shaft during its rotatable movement.

3. A planter of the class described, comprising, in combination with the seed-dropping shaft thereof, a lug-bearing rock shaft connected therewith; numerical scale-strips disposed substantially parallel with the line of draft, rearwardly of the seed-dropping shaft; a pair of horizontally-disposed, disk-housing collars stationary upon the planter frame, each having a peripherally arranged numerical scale corresponding with said scale-strips; rotatable, toothed ground-wheels each provided with a gear and disposed adjacent to a disk-housing; a centrally-apertured, lug-bearing, indicating-disk seated in each of said disk-housings; an upright spindle slidably seated in the aperture of each of said disks and provided with a gear in engagement with the gear of one of said ground-wheels, the operation being that a movement of the ground-wheels cause engagement of the lugs of the indicating disks with the lugs of the rock shaft for actuating the seed-dropping shaft.

4. An improvement in planters, comprising, in combination with the double-bladed furrow-openers and, with the seed-dropping shaft thereof, a winged rock-shaft connected with said shaft; toothed ground wheels each being provided with a gear and mounted between the blades of a furrow-opener; a pair of upright spindles each having a gear connected with the gear of one of the ground wheels; a pair of horizontal indicating-disks each being splined upon one of said spindles and provided with a contact-arm adapted to engage a wing of the rock-shaft; and means to vertically adjust the ground wheels to cause their engagement or disengagement with the ground.

5. An improvement in planters, comprising, in combination with the frame, the seed-dropping shaft and furrow-openers supported by the frame; a pair of hangers arranged for and disposed adjacent to the sides of said furrow-openers and supported by the frame, each having a supporting plate resiliently mounted and slidable thereon; a pair of toothed ground wheels each provided with a shaft and a gear; one of said ground wheels being disposed between the blades of each furrow-opener, its shaft having bearings in said supporting-plates: a pair of upright spindles each having a gear connected with the gear of one of the ground wheels; a pair of horizontal indicating-disks each being splined upon one of said spindles and provided with a contact-arm adapted to engage a wing of the rock-shaft; and means to control the slidable movements of said supporting-plates.

In testimony whereof I have affixed my signature in presence of two witnesses.

SAMUEL H. KLINE.

Witnesses:
L. K. MOORE,
J. P. BOUNDS.